(12) United States Patent
Jennings (10) Patent No.: US 6,358,616 B1
(45) Date of Patent: Mar. 19, 2002

(54) PROTECTIVE COATING FOR METALS

(75) Inventor: Hamlin M. Jennings, Wilmette, IL (US)

(73) Assignee: Dancor, Inc., Newport Beach, CA (US)

( * ) Notice: Subject to any disclaimer, the term of this patent is extended or adjusted under 35 U.S.C. 154(b) by 0 days.

(21) Appl. No.: 09/621,215

(22) Filed: Jul. 21, 2000

Related U.S. Application Data (60) Provisional application No. 60/183,519, filed on Feb. 18, 2000.

(51) Int. Cl.[7] .............................................. B32B 15/04
(52) U.S. Cl. ........................ 428/450; 428/457; 428/469; 428/701; 428/702
(58) Field of Search .................................. 428/450, 457, 428/469, 701, 702

(56) References Cited

U.S. PATENT DOCUMENTS

| | | |
|---|---|---|
| 2,952,562 A | 9/1960 | Morris et al. |
| 2,978,361 A | 4/1961 | Seidl |
| 2,998,328 A | 8/1961 | Munger et al. |
| 3,306,765 A | 2/1967 | DuFresne et al. |
| 3,423,229 A | 1/1969 | Kompanek, Jr. et al. |
| 3,499,780 A | 3/1970 | Etherington et al. |
| 3,625,737 A * | 12/1971 | Ricchezza et al. |
| 3,658,662 A | 4/1972 | Casson, Jr. et al. |
| 3,663,290 A * | 5/1972 | Klinge |
| 3,775,266 A | 11/1973 | Ikeda et al. |
| 3,776,747 A | 12/1973 | Ballard |
| 3,791,860 A * | 2/1974 | Zelley et al. |
| 3,989,550 A | 11/1976 | Newhard |
| 4,082,626 A | 4/1978 | Hradcovsky |
| 4,098,194 A | 7/1978 | Miller et al. |
| 4,120,702 A | 10/1978 | Akerblom |
| 4,125,651 A * | 11/1978 | Campbell et al. |
| 4,150,191 A | 4/1979 | Karki |
| 4,166,777 A | 9/1979 | Casson, Jr. et al. |
| 4,184,926 A | 1/1980 | Kozak |
| 4,225,398 A | 9/1980 | Hasegawa et al. |
| 4,347,285 A * | 8/1982 | Batdorf |
| 4,376,814 A | 3/1983 | Walls |
| 4,379,196 A | 4/1983 | Halper |
| 4,450,209 A * | 5/1984 | Hara et al. |
| 4,492,616 A | 1/1985 | Pliefke et al. |
| 4,588,025 A * | 5/1986 | Imai et al. |
| 4,620,904 A | 11/1986 | Kozak |
| 4,647,479 A | 3/1987 | Montes |
| 4,659,440 A | 4/1987 | Hradcovsky |
| 4,661,334 A | 4/1987 | Latourrette et al. |
| 4,689,272 A | 8/1987 | Simon et al. |
| 4,710,309 A | 12/1987 | Miller |
| 4,746,555 A | 5/1988 | Luckanuck |
| 4,758,281 A | 7/1988 | Eckler et al. |
| 4,762,753 A * | 8/1988 | Perfetti |
| 4,792,358 A * | 12/1988 | Kimura et al. |
| 4,793,903 A | 12/1988 | Holmquist et al. |
| 4,810,741 A | 3/1989 | Kim |
| 4,828,616 A | 5/1989 | Yamasoe |
| 4,957,159 A | 9/1990 | Mizoguchi et al. |
| 4,988,396 A | 1/1991 | Bibber |

(List continued on next page.)

FOREIGN PATENT DOCUMENTS

| | | |
|---|---|---|
| JP | 57-82476 | 5/1982 |
| JP | 58-106397 | 6/1983 |
| JP | 60-181295 | 9/1985 |
| JP | 1-240674 | 9/1989 |
| JP | 2-25580 | 1/1990 |
| NL | 2 229 774 | 1/1974 |

*Primary Examiner*—Deborah Jones
*Assistant Examiner*—Jennifer McNeil
(74) *Attorney, Agent, or Firm*—Knobbe, Martens, Olson & Bear, LLP (57) ABSTRACT

Disclosed herein is an alkali silicate based protective coating for metal surfaces. The coating is substantially defect free, and provides for an impedance of as high as one million ohms or more at a frequency of about 10 Hz.

33 Claims, 4 Drawing Sheets

U.S. PATENT DOCUMENTS

| | | |
|---|---|---|
| 5,091,224 A | 2/1992 | Kushida et al. |
| 5,108,793 A | 4/1992 | van Ooij et al. |
| 5,200,275 A | 4/1993 | van Ooij et al. |
| 5,205,874 A | 4/1993 | Crews, IV et al. |
| 5,240,589 A | 8/1993 | Bartak et al. |
| 5,264,113 A | 11/1993 | Bartak et al. |
| 5,266,412 A | 11/1993 | Bartak et al. |
| 5,275,713 A | 1/1994 | Hradcovsky |
| 5,389,405 A | 2/1995 | Purnell et al. |
| 5,412,011 A | 5/1995 | Morris et al. |
| 5,451,431 A | 9/1995 | Purnell et al. |
| 5,466,280 A | 11/1995 | Lee et al. |
| 5,492,766 A | 2/1996 | Howard et al. |

* cited by examiner

PROTECTIVE COATING FOR METALS

CROSS-REFERENCE TO RELATED APPLICATIONS

The present application claims priority to provisional patent application Ser. No. 60/183,519, entitled Macro-Defect Free Chemically Bonded Inorganic Sol-Gel Coating For Metals, filed Feb. 18, 2000.

BACKGROUND OF THE INVENTION

It is well known that many metal surfaces corrode over time when exposed to the atmosphere. Such corrosion typically results from oxidation of the exposed metal on the surface, as for example when iron rusts. Corrosion of metal surfaces is generally undesirable, as it weakens the structural integrity of the metal and degrades the appearance of the metal surface.

To prevent corrosion, coatings have been applied to metal surfaces to shield the metal surface from the atmosphere and prevent oxidation. Simplistic coatings, well known in the prior art, include paints and varnishes which are applied over the surface of the metal. While efficacious in preventing corrosion, such coatings are generally colored, and cover the surface to prevent viewing the metal surface.

One class of coatings which are clear and have been used for metal surfaces are those derived from alkali silicates. For example, alkali silicate coatings have been used for aluminum surfaces, and generally consist of a transparent or translucent glass-like layer over the surface of the metal to shield it from the atmosphere. While possessing desirable clarity properties, the prior art silicate coatings are generally unsuited for high performance corrosion protection. This is because prior art coating processes are incapable of producing a silicate coating that is free from microscopic defects. Where such defects exist on the surface of the coating, there is increased likelihood that the coating will fail, and the metal surface may become exposed to the atmosphere at the point of the defect, with resulting corrosion. Metal surfaces coated with prior art silicate coatings are therefore susceptible to "pitting" over time, the pits appearing at points on the surface where defects are present in the coating.

Consequently, there exists a need for silicate coatings for aluminum surfaces with few or no microscopic defects, such that the improved coating may exhibit high performance corrosion resistance.

SUMMARY OF THE INVENTION

The present invention advantageously addresses the shortcoming of the prior art by providing a silicate based coating that is largely free from defects which cause corrosion. The superior properties of the coating of the present invention may be characterized by its electrical properties such as impedance. A high impedance value at a low frequency is indicative of a defect free coating.

In one embodiment of the present invention, there is provided an alkali silicate coating on a conductive metal surface. The coating has an impedance of at least about 100,000 ohms at a frequency of about 10 Hz, more preferably 300,000 ohms, still more preferably 500,000 ohms, and most preferably 1 to 2 millions ohms or more. Furthermore, it is preferred that the coating have an impedance greater than about 50,000 ohms at a frequency of about 100 Hz, more preferably greater than about 100,000 ohms, and most preferably 300,000 ohms or more. The alkali silicate coating is applied in part by immersing the metal surface in a chamber containing an alkali silicate solution, and electrifying the metal surface while imparting mechanical energy to the surface and the solution. The alkali silicate may be derived from sodium silicate or potassium silicate, or a combination of both Metals which can be coated using the present invention include aluminum, brass, steel as well as other conductive metals.

The coating is capable of preventing pitting when the coated metal surface is subjected to CASS Test ASTM B368-85 for a time period of 48 hours. Furthermore, the coating is capable of preventing formation of pits having a diameter greater than 0.1 mm in an aluminum surface, when the surface is subjected to CASS Test ASTM B368-85 for a time period of 60 hours. For example, when subjected to this test, at least a portion of the coated surface having an area of 2 square inches is capable of withstanding the ASTM CASS test #B368-85 test for 48 hours without formation of corrosion points within the area greater in diameter than 0.1 mm.

In another aspect of the present invention, there is provided a method of forming a protective silicate coating on a metal surface. The method comprises immersing a metal surface into a solution containing alkali silicates. An electric connection is made with the metal surface such that it functions as an anode. A voltage is applied to the metal surface, while simultaneously imparting mechanical energy to the metal surface and solution, such that silicate particles form a coating on the metal surface. The coated metal surface is then removed and the coating is cured by heating.

DETAILED DESCRIPTION OF THE PREFERRED EMBODIMENTS

The present invention provides a silicate based coating which is largely free of defects, and a unique method of forming such a coating. It is believed that the coating possesses few, if any, microscopic defects per square centimeter of coating surface. Such defects result in corrosion pits when the coated article is exposed to accelerated corrosion testing.

It is believed that the inner part of the coating is formed by a chemical reaction between the metal and the alkali silica solution. The inner portion consists of at least two chemical components; one component from the metal, such as aluminum, brass or steel (in the case of an alloy this could be one or more of the alloy elements), and one component from the solution. More than one component may come from either or both the solution and metal. The outer portion of the protective layer is believed to be gelled silica with a unique ratio of silica to alkali in the interstitial spaces to prevent cracking, where X is an alkali metal, selected from the group consisting of lithium, sodium, and potassium, with sodium being preferred.

The coating may range from 0.5 to 20 μm in thickness, more preferably 0.8 μm to 3.0 μm. For commercial applications, such as coating the surface of an aluminum wheel to prevent corrosion, the coating is preferred to be 2 μm to 4 μm in thickness. Where harsher environments are expected, as near the ocean, it is preferred that the coating be somewhat thicker, such as 3 μm to 5 μm. The coating produces a clear layer which is hard, yet somewhat flexible. The coating may have a pencil hardness of at least 6H, more preferably at least 7H, and optimally from 7H to 9H, as tested in accordance with ASTM Test Method for Film Hardness by Pencil Test #D 3363-92a.

To make the silicate coating of the present invention, a metal surface to be coated must be provided. The metal can be any of the electroconductive metals coatable by silicate based coatings, such as aluminum, brass, or steel, with aluminum being particularly preferred. Generally, the resulting coating performance will increase in relation to the smoothness of the surface being coated. For example, high performance corrosion protection under extremely harsh conditions, such as those present in the ASTM CASS Test #B 368-85, is more easily achieved when the coating is applied to an aluminum substrate with a polished surface. Smoothing metal surfaces prior to coating can be performed by any of the methods known to those of skill in the art, such as buffing, polishing and the like.

The metal surface must also be clean enough to enable the reaction sequences described below. Experience has shown that a wide variety of cleaning methods may be used to prepare the metal surface, such as scrubbing with detergent and water, solvent cleaning to remove organics and grime, and the like. One suitable method of cleaning is to use Simple Green concentrated cleaner, at a ratio of 10 parts deionized water to 1 part Simple Green. Ultrasonic cleaning baths may also be used. Moreover, where the metal surface is clean to begin with, no separate cleaning step is required. If cleaning is performed, the metal surface should then be dried and any excess solvent or cleaning solution removed. Drying may be by cloth, air blower, oven, air drying, combinations of the foregoing, or any other method which results in the metal surface being substantially free of moisture.

It has been observed that superior coatings may be formed when, after drying, or as a drying step, a flame is applied to the metal surface to be coated. For aluminum surfaces, the flame is preferably at least 500° C., more preferably at least 1200–1300° C., and may be as hot as 3000° C. Suitable sources for applying the flame include acetylene torches, propane torches and acetylene and/or propane torch as with added oxygen. It is important not to over torch, however, so as to melt or damage the metal surface. Generally, from 1 to 60 seconds, more preferably 5 to 10 seconds of torching on a particular portion of the surface with a torch having a flame with a temperature of about 1900° C. has been found to be sufficient for aluminum surfaces. Alternatively, instead of torching, the metal object can be placed in an oven having a temperature greater than 110° C. to remove water from the metal object.

After drying, the metal surface may be permitted to cool if necessary. Preferably, the metal surface will cool to a temperature of between 35° C. and 75° C., more preferably 45° C. and 55° C. Final cooling temperatures outside of these ranges may function in the present invention, but it should be appreciated that if the metal surface is too hot when dipped in the coating solution (described below), damage to the metal may occur.

Once sufficiently cooled, the metal surface to be coated is dipped in an alkali silicate solution. The solid alkali silicate used to form the solution preferably has a silica to alkali ratio of from 2.0 to 3.6 for sodium silicates, more preferably about 3.2. One suitable sodium silicate is sold as 3.22 by P.Q. Corporation. Preferred ratios for potassium silicate is 1.6 to 2.5 silica to potassium, preferably 2.5. Sodium silicate is preferred, with concentration ranges of from 5–125% (v/v) sodium silicate to water (preferably deionized), more preferably from 20–100% (v/v) sodium silicate to water, and optimally 60–80% (v/v) sodium silicate to water. The specific gravity of the aqueous sodium silicate solution may be between 1.02 to 1.3, with a preferred specific gravity of about 1.18 corresponding to about a 80% (v/v) of sodium silicate to deionized water. When aqueous alkali silicate solutions other than sodium silicate are used, or mixtures of alkali silicate solutions are used, similar concentration ranges will suffice. The solution should then be filtered with a filter having pores of from 1 to 10 micrometers, more preferably 1–5 micrometers, and optimally 1 micrometer or less. For example, the sodium silicate solution may be filtered with 1 micrometer retention paper (Quantro) after thorough mixing in order to remove as many particulates present in the solution that may result in a "cloudy" appearance in the coating. Where a mixture of sodium and potassium silicates are used, it is preferred that the weight ratio of potassium to sodium be 1:10

It is also preferred to heat the alkali silicate solution during the coating process. The solution may be heated from about 30° C. to about 90° C., with temperatures in the range of 40° C. to 60° C. being preferred.

Preferably, chemicals or other agents are added to the alkali silicate solution to control the air content and the surface tension. Any of a wide variety of commercially available defoaming and wetting agents may be used. For example, the common wetting agent 1-butanol may be added in a concentration ranges of 2 g to 50 g per 2.25 L sodium silicate solution, with a concentration of 10.36 g/2.25 L sodium silicate solution presently preferred. Suitable defoaming agents include Dee Fo #916, available from Ultra Additives, in concentrations ranging from 600 microliters to 2000 microliters per 2.25 L sodium silicate solution, with 1200 microliters/2.25 L sodium silicate solution being preferred. Other suitable defoaming agents include PI-35/50, 30H and XHD-47J, all from Ultra Additives. As will be appreciated by those of skill in the art, a wide variety of other wetting agents and defoamers may be used to produce solutions which have properties similar to those identified above.

The portion of the metal surface to be coated is completely immersed in the alkali silicate solution. Preferably the alkali silicate solution is contained in an ultrasonic bath, such as that sold by Branson as model #CH2024-40-36. An electrical connection (e.g. an alligator clip with a wire) is applied to the metal surface to be coated such that the metal surface will function as the anode. A suitable cathode, such as a platinum grid, is positioned in the solution, preferably from 3–5 inches from the metal surface to be coated. Other suitable metals for cathodes include aluminum, titanium, stainless steel, or gold.

From 2 to 100 volts may be applied to the metal surface, with voltages within the range of 20 to 60 volts being preferred. The electricity causes a chemical reaction that produces both hydrogen and oxygen gas bubbles on or near the surface of the metal being coated. These gas bubbles interfere with the packing of the silicate particles on the surface of the metal. Preferably, these bubbles are removed by imparting mechanical energy to solution and metal by way of vibration. One suitable vibration introducing device is an ultrasonic bath, typically with a frequency range of 25 kHz to 175 kHz. The ultrasonic bath provides ultrasonic treatment to the solution and/or metal substrate being coated, and is used simultaneously with the electrical current flow. The ultrasonic treatment causes the solution and/or metal substrate to vibrate, which dislodges the gas bubbles from the surface of the metal, and also facilitates degassing of the solution. This permits almost instantaneous repacking of silicate particles on the surface to produce a more uniform and dense coating upon the metal surface.

It is believed that the electricity functions to alter and control the ratio of silicate solid particles to alkali silicate at the interface. For preferred embodiments, the molar ratio of $SiO_2$ to $Na_2O$ in solution is 3.22:1. The electricity permits this value to increase at the interface where the coating is being formed, increasing the molar ratio to greater than 3.2:1, and preferably from about 3.5:1 to 4.4:1, and optimally to about 4.13:1. A ratio of 4:13:1 is considered optimal because lower ratios increase the propensity of the coating to break and cause defects, while higher ratios tend to produce a coating which is cloudy.

The voltage is applied until a coating of the desired quality is achieved. Generally, the optimum amount of time needed to produce a coating which is thick, dense and uniform enough to be substantially free of microscopic defects is 5 minutes at 60 volts. Preferred coating times range from 2 minutes to 1 hour, more preferably from 5 minutes to 10 minutes. Of course, as will be appreciated by those of skill in the art, coating times are somewhat dependent on the applied voltage. Varying voltages will require different coating times than lower voltages. For example, an acceptable coating was produced an aluminum panel in 1 hour at a voltage of 5 volts, and a second suitable panel was produced in 3 minutes by a higher voltage of 60 volts. Preferably, as it is coated, the solution is also agitated or stirred. This may be accomplished by stirring the solution, or by moving the metal piece while it is being coated. This facilitates the degassing effects of the ultrasonic bath.

Next, the electricity is turned off, the electric connection is removed, and the coated metal is left in the solution with the ultrasound and agitation still working for from 30 seconds to a minute. The coated metal is subsequently removed from the solution. Following removal, the sample may be rinsed in an alkali silica solution with a different specific gravity from that used in the coating bath. The purpose of this step is to change the viscosity of the outer layer to facilitate drainage of excess fluid. This is particularly helpful for complex shapes. If this step is followed, it is preferred that the specific gravity of the rinsing solution be from 1.01 to about 1.07.

For some shapes, such as an aluminum wheel, coating quality is also observed to be improved when the sample is continuously rotated and spun after removal and rinse to facilitate a uniform thickness. Rotation rates of from 1 to 50 rpm produce benefits, with 3 to 10 rpm being preferred. Conventional rotation apparatus may be used, such as the IRB 4400 ABB Flexible Automation System manufactured and sold by ABB Robotics Products AB.

An optional first baking step may then be used to treat the object. This step consists of placing the coated article in an oven and baking the article at from about 90° C.–150° C. for about 20 minutes. Baking may be accomplished by inserting the article in an oven at room temperature, and programming the oven to increase in temperature at 5° C. per minute up to the desired final temperature, or by inserting the article directly into an oven pre-heated to the desired final temperature. After the article has been exposed to at least 90° C. for 20 minutes, the temperature of the oven is decreased at about 5° C. per minute down to room temperature. (This ramp down step has been found to be necessary for increased corrosion resistance.)

The next step in the process is curing. The aluminum article is cured in an oven which may be set to a temperature of from 150° C. to 300° C., with 220° C. to 275° C. being preferred. The metal object should rise to a temperature of 150° to about 300° C., more preferably 200° to 240° C. The oven may also be temperature controlled, such that the aluminum article is placed in the oven at an initial temperature, and the temperature of the oven increases at from 5–10° C. per minute until the final temperature is reached. As will be appreciated by those of skill in the art, curing times will vary depending upon the size of the object to be treated and the temperature of the oven.

For those applications where it is desirable to remove surface debris from the coated object, after curing the sample may be dipped in an acid solution of pH of about 2. This is the iso-electric point for silica gel, and therefore facilitates removal of surface debris. Acids which may be used include acetic, phosphoric, sulfuric, and the like.

Finally, an optional step is to soak or saturate the coated surface with acetic acid for from 20 minutes to 24 hours. If the substrate is submerged in the acid, the shorter time is preferred whereas if it is only saturated (e.g. covered by a cloth soaked with acetic acid) the longer treatment time is preferred. This removes some of the outer layer which contains the alkali metal such as sodium. Over time this excess thickness can react with moisture and carbon dioxide to produce salts that cause the otherwise clear coating to become hazy. Although the haze can generally be washed off, it may be desirable to remove it during the manufacturing process.

EXAMPLES

Example 1

An aluminum or aluminum alloy surface may be treated to produce a hard, heat and corrosion resistant transparent coating thereon as follows:

An aluminum panel with an area of 15 sq. in. and a thickness of 0.25 in. is first cleaned with detergent and water and dried with a soft cloth or air dryer. The panel is then torched at a temperature of about 1000–1900° C. until signs of moisture are no longer apparent. The panel can be cooled to a temperature between 40 to 89° C. In the preferred process, the panel is cooled to about 50° C. It is then immersed in an electrolyte solution about 3–5 inches from a cathode made up of a platinum grid. The electrolyte solution consists of a diluted sodium silicate aqueous solution (1 $Na_2O$: 3.22 $SiO_2$). The specific gravity of the aqueous sodium silicate solution could be between 1.02 to 1.3—the preferred specific gravity is about 1.18 or about 45% v/v sodium silicate. The solution should then be filtered with a filter having pores of from 1 to 10 micrometers, more preferably 1–5 micrometers, and optimally 1 micrometer or less. For example, the sodium silicate solution may be filtered with 1 micrometer retention paper (Quantro) after thorough mixing in order to remove as many particulates present in the solution that may result in a "cloudy" appearance in the coating.

Added to this filtered sodium silicate solution (45% v/v) are the additives—1-butanol (n-butyl alcohol)(~0.4% bwt) (wetting agent) sold by Fisher Scientific Co. and Dee Fo

916 (antifoam/defoamer) (~0.00003% bwt) obtained from Ultra Additives. Thorough mixing of these additives in the solution is necessary in order to optimize coating properties (i.e., appearance and corrosion resistance). The solution is then heated to a temperature which can range anywhere between room temperature to its boiling point. The preferred temperature for this method, however, is in the range of 40–60° C.

After mixing in the additives and heating the solution to the desired temperature, a thin film on the surface of the solution can be observed (similar to oil on water) caused by the Dee Fo. This film should be removed as much as possible (i.e. by dragging cloths across the surface) in order to optimize coating properties. The panel is coated in this solution anywhere from one minute to one hour—the preferred time being between five to ten minutes. A voltage is supplied across the panel and cathode during this time. The voltage applied can range between two volts and 100 volts depending on the size and type of the substrate. For the particular aluminum panel, 50 to 60 volts is the preferred voltage range for a time period of five minutes; observed current density after one minute coating was ~0.05 A/in$^2$, after 2 minutes coating ~0.04 A/in$^2$, and after 5 minutes coating ~0.03 A/in$^2$. In addition, the coating procedure takes place in an open ultrasonic chamber (Branson model # CH2024-40-36) while the solution is agitated in order to create turbulence. The ultrasonic chamber was set to high rate, power mode, and 100% power during the application of electricity during the coating process. Solution agitation is achieved by propeller or simultaneous filtration. The panel is coated in the sodium silicate solution with electricity, ultrasound, and solution agitation all working simultaneously. After five to ten minutes of coating, the electricity can then be turned off while the ultrasound and solution agitation continue for an additional 30 to 60 seconds. This is to ensure that there are no air, hydrogen or oxygen bubbles present on the surface of the panel created by the application of electricity. The panel is then carefully pulled from the solution and placed in a room temperature oven.

The oven is programmed to increase to 90° C. with a rate of 5° C. per minute, remain at 90° C. for 20 minutes, and decrease back to room temperature with a rate of 5° C. per minute. In this first bake step the ramp up to 90° C. can be eliminated, in which case the panel is placed straight into a preheated 90° C. oven for 20 minutes and then the oven is programmed to ramp down to room temperature. The ramp down step from the maximum temperature of the first bake process has been found to be important in improving the corrosion resistant properties of the coating.

Once the first bake process is completed and the panel temperature has cooled to about 30° C., it is immersed in room temperature deionized water for 30 to 40 seconds. The panel is then dried with an air dryer. The coating should appear, however, very water resistant having only a few "beads" of water droplets on the surface of the panel after pulling from the deionized water. The panel is then placed in a preheated 200° C. oven for 30 minutes to cure the coating. After 30 minutes, the panel is taken out of the oven and cooled at room temperature. Once cooled to about 30° C., the panel is acid treated: it is either placed in a room temperature acetic acid solution with a pH of two for 20 minutes or in a 55° C. phosphoric acid solution with a pH of two for 18 seconds. It is then rinsed again in deionized water for about 30 seconds.

Example 2

To further increase the corrosion resistant properties of the coating, multiple coats may be applied. For a second coat, the above procedures presented in Example 1 are repeated starting with the torch step. A second coat can also be obtained without the use of electricity or ultrasound by placing the panel in the sodium silicate solution for five minutes, followed by the remaining steps noted above. It should be understood, however, that the use of electricity and ultrasound has proven to increase corrosion resistant properties for multiple coated articles.

Example 3

An aluminum wheel may be treated to produce a hard, heat and corrosion resistant transparent coating thereon as follows:

A forged aluminum wheel having a polished surface is thoroughly cleaned with detergent and water. To ensure that all dirt is removed, especially in any crevice that may be presented on a wheel, it is recommended that the cleaning also be done within an ultrasonic chamber. The wheel is then dried with a soft cloth or air dryer. The entire polished area is slowly torched until signs of moisture are no longer apparent. Torching is accomplished using a propane torch set to produce a flame having a temperature ranging from 1500° C. to 2000° C. The surface of the wheel is torched for several seconds, until no moisture is observed to be bleeding from the surface. The wheel is cooled to a temperature between 40 to 80° C. (preferably 50° C.) and placed in an electrolytic sodium silicate solution prepared the same way as described in Example 1. The wheel is also coated in an ultrasonic chamber with electricity and solution agitation. The voltages applied and coating times again are 50–60V for five minutes. The preferred electricity treatment for an aluminum wheel (with a diameter of ~16–18 inches and width of 9–12 inches) is 60V for 5 minutes. After the coating treatment, the wheel is positioned within the solution so that the polished face is perpendicular to the solution surface. The wheel is then slowly pulled from the solution while any excess solution in the crevices or ridges of the wheel is removed (i.e. with a dry cloth). Once the wheel is completely out of the solution, it can be placed on a rotating apparatus with the polished side down and spun at about 5 revolutions per minute until the surface of the wheel appears to be dry. This spinning process also seems to produce a more uniform coating on the complex structure of the wheel. The first bake, rinsing, curing, and final acid treatment for the wheel follow the same procedures described in Example 1 for the aluminum panel.

Example 4

The procedures describe in Examples 1 and 3 result in a coating with optimal corrosion resistant properties and optimal appearance (i.e. no drip marks). These coating processes take more time, as the article being coated must be handled carefully to prevent drip marks or other imperfections in appearance, particularly when coating wheels. For certain applications, coating appearance is less important. Therefore, an alternative method is desirable for creating a coating that still displays good corrosion resistant properties, takes less time, but does not attempt to optimize appearance:

An aluminum panel is cleaned and coated following the procedures described in Example 1. After the treatment in the sodium silicate solution with electricity, ultrasound, and solution agitation, the panel is pulled from the solution and is then immersed and pulled out of a more diluted sodium silicate solution (specific gravity between 1.03 to 1.1). Butanol and Dee Fo can also be added to this rinse solution with the same procedure described in Example 1 to increase corrosion resistant properties of the coating. The temperature of this rinse solution can be from room temperature to 90° C. The preferred temperature for the rinse solution is about 60° C. when the main coating solution is from room temperature to 60° C. Room temperature deionized water instead of the more diluted sodium silicate solution could be used in this rinse step although this results in a thinner coating and a reduction in corrosion resistant properties. This rinse step could last between two to ten seconds altogether (starting when any portion of the panel enters the solution and ending when the panel is completely out). After this rinse step, the panel is placed in a preheated oven at a temperature between 150–300° C. for 20 to 60 minutes. In the preferred process, the panel is placed in a 275° C. oven for about 30 minutes. After the panel is baked, it is cooled to about 30° C. and acid treated and rinsed with the same procedures described in Example 1.

Example 5

This example describes the method by which a wheel is coated with the aid of a robot that can easily manipulate the movement and angle of the wheel during the coating procedure.

The robot used is available as model no. ABB Flexible Automation IRB 440 sold by ABB Robotics Products AB. The robot is programmed to perform all stages in the wheel coating procedure including: cleaning, rinsing, torching, coating in the main sodium silicate solution, rinsing in the more dilute sodium silicate solution, and drying and curing. The wheel is picked up (polished side face up) by the robot from a stage and placed in an ultrasonic tank filled with cleaning solution (10 parts deionized water with 1 part simple green) for two minutes while the ultrasound is turned on. After two minutes the wheel is removed and placed in a tank of deionized water while it is rotated (~20–30 rpm) for about 15–20 seconds and is then sprayed with deionized water to remove any residual cleaning solution. The wheel is then brought to a torch station where it is rotated (~0.8 rpm) and torched to remove moisture from the surface for about 90 seconds (the temperature of the wheel after this time is around 50–60° C.). After torching, the wheel is immediately immersed in ~30–40° C. sodium silicate main solution (specific gravity ~1.18 with butanol and Dee Fo—see Example 1 for amount and preparation of solution) face up. Electricity is applied (~60V) using a 6 in. by 6 in. platinum grid as the cathode. Ultrasound is turned on with the electricity while the wheel is rotated in the solution. The rotation of the wheel is in one direction for 400 degrees (~20–30 rpm) then in the opposite direction for 400 degrees (~20–30 rpm). This alternating rotation and ultrasound is continued for ~6 minutes while the electricity is turned off after ~5 minutes (amperage after 5 minutes at 60V is between 5–15 amps depending on type of wheel). The rotation of the wheel is stopped and the wheel is pulled out of the main solution. The wheel is then quickly dipped face up in the more dilute sodium silicate rinse solution (specific gravity ~1.075 with butanol and Dee Fo additives). The pulling and drying procedure out of this rinse solution is significant to the appearance and corrosion resistant properties of the coating. The pulling and drying routine creating consistently good coatings is as follows: the wheel starts to come out of the rinse solution at a ~15 degree angle from the wheel's horizontal position. The wheel begins to rotate (~5.8 rpm) as it comes completely out of the solution to a ~54 degree angle. The wheel remains in this position while rotating for ~5 seconds to allow the back of the wheel to drain and is then positioned to be at a ~126 degree angle to allow access solution on the front of the wheel to drain (rotation still in progress). The angle is then slowly changed to ~110 degrees and the wheel is allowed to rotate until dry. During this drying step excess solution is removed from the back of the wheel with a sponge. A smaller portion of a natural sponge is also placed gently on the polished surface of the wheel's outer edge to absorb any more excess solution.

Example 6

To increase corrosion resistant properties of coatings described in Examples 4 and 5 a second coating may be applied. For a second coat, the sample is torched again (after the acid and final rinse steps of Examples 4 and 5) until all signs of moisture are no longer apparent. The procedure for the first coat is repeated for the second coat.

Example 7

A panel or wheel that had been previously coated with a sodium silicate coating may sometimes display a rainbowing appearance on the surface due to the refractive properties of a thin-layered coating. A thin coating usually results when a lower specific gravity solution is used, or a longer rinse time is performed. If it is desired to eradicate the rainbowing effect, it is necessary to thicken the sodium silicate coating. The best procedure to accomplish this task is describe in the following example:

The wheel or panel that had been already coated is submerged in a hot diluted sodium silicate solution (preferred specific gravity ~1.07 and solution temperature 70–90° C.). It is left in this solution for 2–10 minutes (preferably 5 minutes) while rotating (30–60 rpm). The sample is then pulled out of the hot solution with the same procedure described in Example 7 and placed in a 250–280° C. oven for 10–20 minutes.

Example 8

To achieve a more uniform property gradient over the coating, it may be desirable to create a coating with an applied constant current while the voltage is allowed to vary.

An aluminum panel is prepared similar to Examples 1 and 5, by cleaning and torching. It is then immersed in the same electrolyte sodium silicate solution with additives as in Example 1. The panel is coated in this solution anywhere from one minute to one hour (the preferred time being between five to ten minutes) while a fixed current is supplied across the substrate and cathode. The constant current applied can range between 0.2 and 10.0 amps depending on the size and type of the substrate (0.2 A for aforementioned panels; 10.0 A for aluminum rims). For an aluminum panel coated with an applied constant current of 0.5 amps over the span of 10 minutes, the voltage started from 18.0V to a final 60V. As in Example 1, the coating procedure takes place in an open ultrasonic chamber with simultaneous filtration to allow for solution turbulence. After five to ten minutes of coating, the electricity is then turned off while the ultrasound and solution agitation continue for an additional 30 to 60 seconds. The bake and acid treatment after this coating procedure is the same as those for the above samples.

Example 9

Aluminum panels or wheels can also be coated with a potassium silicate solution or a mixture of both silicate solutions. The general methods for preparing the solution, cleaning the substrate, coating the substrate, and baking for the sodium silicate solution (in the above examples) are basically the same when using a potassium silicate solution. The potassium silicate used is named KASIL #1 (from PQ Corporation) with the weight ratio of $SiO_2/K_2O$ equal to 2.50. For aluminum panels, the preferable specific gravity of the main potassium silicate solution is 1.18 or 75% v/v potassium silicate. If a rinse solution is used, the preferred specific gravity for potassium silicate is ~1.07. Butanol (~0.4% bwt) and Dee Fo (~0.00003% bwt) are also added in the same manner as in the case for the sodium silicate solution (see example 1). During coating with the epotassium silicate solution, the preferred electricity treatment is 10 volts for 5 minutes while the ultrasound and solution agitation last for about 6 minutes. Potassium silicate coatings have the tendency to dry faster and seem to result in a more even coating than the sodium silicate coatings.

Example 10

Brass surfaces can also be coated using similar methods as used for aluminum surfaces. The only difference to the aforementioned procedure is the electricity treatment. The preferred electricity treatment for brass samples is to reduce the voltage to between 1 and 5 volts, with a voltage of 3.5V and coating time of 5–10 minutes producing an acceptable coating.

Example 11

Example 5 describes the coating method for a forged aluminum wheel. Cast aluminum wheels may also be coated with sodium silicate or potassium silicate solutions with slight variations in solution specific gravity, temperature, and electricity treatment due to the more porous nature of cast wheels. The preferred specific gravity, solution temperature, and electricity treatment for forged and cast wheels are summarized in table 1.

Table 2 shows the electricity treatment and behavior for various substrates coated in sodium silicate or potassium silicate solution.

TABLE 1

| Sample | Main Solution: Specific gravity Temperature | Rinse Solution: Specific gravity Temperature | Electricity CV (current range) or CC (voltage range) |
|---|---|---|---|
| 1. Forged Wheel in NaSi Solution | 1.18 room temperature | 1.075 50° C. | CV 60V (35–8A) |
| 2. Forged Wheel in KSi Solution | 1.15 room temperature | 1.07 50° C. | CV 15V (30–3A) |
| 3. Cast Wheel in NaSi Solution | 1.18 room temperature | 1.03 40° C. | CV 25V (25–3A) CC 3A (6–24V) |
| 4. Cast Wheel in KSi Solution | 1.15 room temperature | 1.07 40° C. | CV 25V (25–2A) CC 3.5A (6–25V) |

*CV implies the electricity treatment was carried out under constant voltage conditions
*CC implies the electricity treatment was carried out under constant current conditions

TABLE 2

| SAMPLE | Constant Voltage (Amps after 0, 1, 2, 3, 4, 5 minutes into coating) | Constant Voltage (Volts after 0, 1, 2, 3, 4, 5 minutes into coating) |
|---|---|---|
| Cast Al Wheel (in NaSi Solution) | 25 V (25.0A, 5.7A, 4.4A, 3.6A, 3.0A, 2.8A) | 3.0 Amps (6.2V, 15.2V, 19.8V, 21.5V, 23.3V, 24.3V) |
| Cast Al Wheel (in KSi Solution) | 25 V (25.0A, 5.3A, 4.0A, 3.2A, 2.8A, 2.4A) | 3.5 Amps (6.2V, 17.7V, 21.5V, 23.2V, 24.6V, 25.0V) |
| Al panel (in NaSi Solution) | 60 V (30A, 1.1A, 0.7A, 0.51A, 0.40A, 0.35A) | 1.2 Amps (6.0V, 21.4V, 26.3V, 30.7V, 37.0V, 48.5V) |
| Al panel (in KSi Solution) | 15 V (5.0A, 0.26A, 0.15A, 0.12A, 0.1A, 0.09A) | 0.35 Amps (5.0V, 9.7V, 15.6V, 17.8V, 18.4V, 19.5V) |
| Brass panel (in NaSi Solution) | 3.5 V (0.635A, 0.625A, 0.615A, 0.615A, 0.615A, 0.604A) | 0.8 Amps (4.0V, 3.88V, 3.88V, 3.9V, 3.9V, 3.92V) |

Example 12

An acrylic coating (such as Krylon) may be applied on top of the sodium and/or potassium silicate coatings in order to provide more protection against corrosion. This type of coating is particularly beneficial when applied to brass substrates bearing the alkali silicate coating of the present invention. The means by which the acrylic coating is applied is described as follows:

The entire coating procedure as described in example 4 is performed on an aluminum panel. After the final curing step and cool down to room temperature, the panel is submerged in room temperature acetic acid (pH=2) for from 3 to 10 minutes, preferably about 5 minutes. The panel is then rinsed in deionized water and the surface is dried. Krylon is then sprayed evenly over the entire surface until it starts to flow. Multiple layers of Krylon can be applied depending on the desired thickness and smoothness with 5–10 second intervals between layers. This acrylic coating is allowed to dry for at least one to two weeks to maximize adhesion and corrosion resistance.

Comparative Examples and Testing

To demonstrate the improved high performance corrosion protection of the coating of the present invention, several prior art sodium silicate coatings were replicated and tested against the present coatings.

Comparative Example 1

Comparative Example 1 replicates the sodium silicate coatings taught in U.S. Pat. No. 5,205,874. To make this coating, an aluminum panel having dimensions 5.015 in.× 3.013 in.×0.122 in. was first cleaned with detergent and hot water. It was then immersed in a 60° C. 25% solution of $H_3PO_4$ for 3 minutes. After removal from the acid solution, a gray smutty film was present and was removed by wiping the panel with a sponge and hot water. The panel was cooled by placing it in an ~18° C. water bath for one minute. While wet, the panel was placed in an 18% (v/v) sodium silicate solution for one minute. It was then placed in a heated oven at 155° C. for 30 minutes. After 30 minutes the oven was turned off and the panel was left to stay in the oven for 10 minutes. It was then removed from the oven and cooled to room temperature. Once cooled, the panel was placed in the 60° C. 25% solution of $H_3PO_4$ for 3 minutes and rinsed in deionized water for 30 seconds.

After the pretreatment in phosphoric acid, the panel displayed a dull, milky color from the reaction with $H_3PO_4$. An iridescent rainbow color was present after coating, but coating was smooth.

Comparative Example 2

Comparative Example 2 replicates the coatings disclosed in U.S. Pat. No. 3,658,662. To create these coatings, the surface of an aluminum panel having dimensions 5.015 in.×3.013 in.×0.122 in. was roughened by hand-sanding the surface with 1500 grit silicon carbide waterproof sandpaper. The surface was subsequently scrubbed and rinsed with water. The surface was allowed to dry and then was dipped in a 50° C. sodium silicate solution (4.05% bwt of silicate ° silica to sodium ratio was 3.2 with a pH of 11) for 60 seconds with an applied voltage of 36 volts. The positive electrode was connected to the panel while the negative electrode was attached to a platinum grid. The panel and platinum grid were placed ~4 inches apart. The amperage at time zero was ~3.5 amps and was decreased to ~0.9 amps after 60 seconds.

The panels were observed to have a dull appearance and rough texture. The coatings on these panels also displayed a rainbow.

Comparative Example 3

Comparative Example 3 replicates the prior art Japanese Patent Publication No. Heisei 2-25580 (1990). An aluminum panel was first cleaned with detergent and water and allowed to dry. It was then dipped in a sodium silicate solution (no added water—silica to sodium ratio of 3.22). After dipping the panel was placed in a preheated oven at 200° C. for 30 seconds.

After this quick bake step, the panel was dipped in a 21% solution of $H_3PO_4$ for 20 seconds and finally rinsed with deionized water.

The coating on these panels started to peel and come off after the dip in phosphoric acid. The resulting coating was "clumpy" and very uneven. No further testing of these coated panels could be performed due to the bad condition of the coating.

Impedance Testing

One method which may be used to determine if an alkali silicate coating on a metal surface has defects is impedance testing. Alkali silicates form a coating consisting in part of silicon dioxide ($SiO_2$), which is an insulative material that is very resistant to the flow of electricity. Conversely, the metal which is coated by the alkali silicate coating is highly conductive, and relatively freely conducts electricity. Consequently, a metal surface coated with an alkali silicate coating should show increased resistance to flow of electricity in comparison to an uncoated metal surface. The degree of difference in restricting electric current flow in comparison to an uncoated sample is an indication of the perfection of the coating. With more perfect coatings, the entirety of the surface of the metal is coated with $SiO_2$, and is insulated, and thus highly resistant to electric current flow. Every defect in the coating surface increases the ability of the coated metal to conduct electricity, because the electrons in the current can flow through the defects into the highly conductive metal. Impedance is also somewhat dependent upon substrate uniformity. Smoother substrates will result in coatings having higher impedance values, all other things being constant.

One measure of resistance to electric current flow is impedance. Impedance is defined as the total opposition to alternating current by an electric circuit, equal to the square root of the sum of the squares of the resistance and reactance of the circuit. Impedance is and is usually expressed in ohms $\Omega$. To determine the impedance of the coatings of the present invention, an uncoated aluminum panel and Comparative Examples 1 and 2, the following testing methodology was used.

Experimental Set-Up

Figures 1A, 1B:
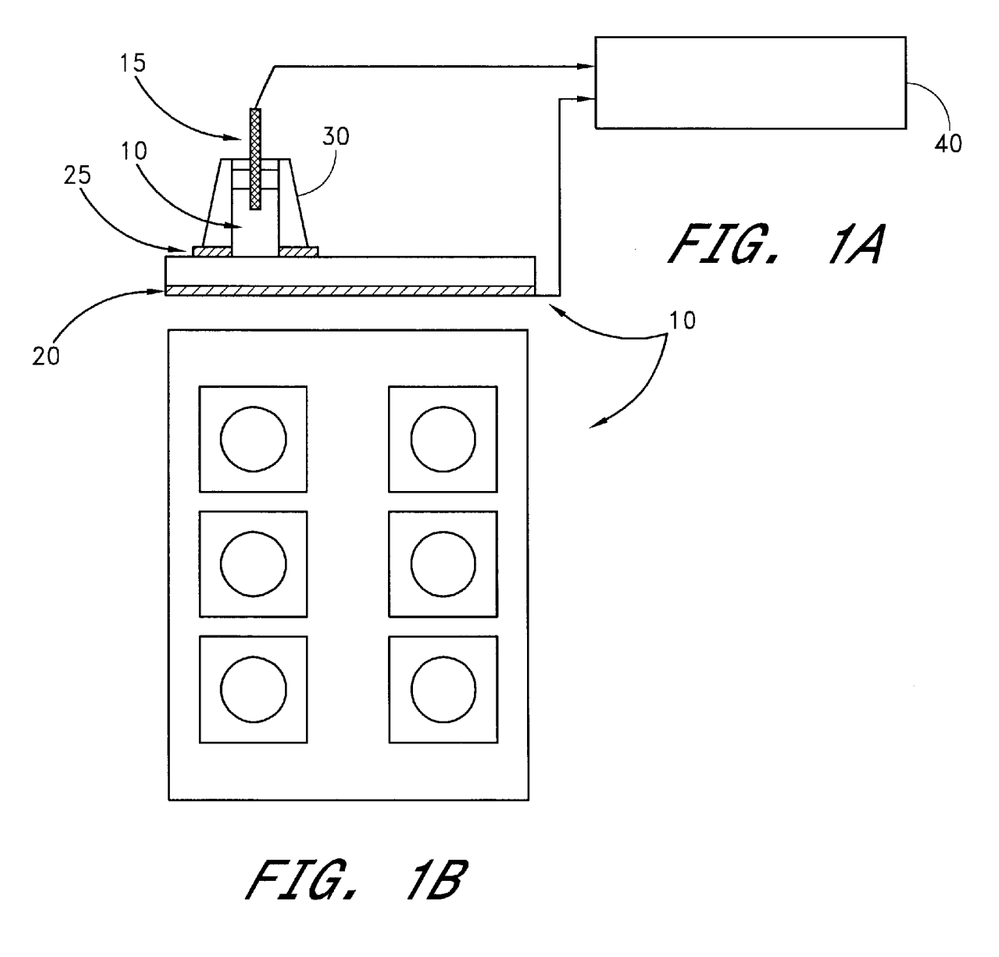
FIGS. 1A and 1B illustrate an experimental apparatus used to assess the electrical properties of the coatings of the present invention.

Impedance spectra were collected using a personal computer-controlled low frequency impedance analyzer (HP 4192A, Palo Alto, A) over 5 Hz-13 MHz frequency range with approximately 20 data points per decade of frequency. The excitation amplitude was maintained at 1V. The experimental apparatus 10 is shown in FIGS. 1A and 1B. Tap water 12 was employed as the dielectric contact medium. Measurements were carried out in two-point configuration as shown in FIG. 1A. The top electrode consisted of a 0.185 inch diameter stainless steel rod 15 and the other electrode was a clamped aluminum foil contact 20 to exposed portions of the underside of each aluminum specimen of interest. Six measurements were made on each coated sample, using the movable insulated reservoir as shown in FIG. 1B. Thick double-stick tape 25 (approximately 1.5" by 1.5") with a center hole ~1 cm diameter served to define the contact area. Secured to this was a hollow rubber stopper 30 which served to contain the tap water and the top measurement electrode. Impedance data was recorded with impedance analyzer were plotted and analyzed using commercially available equivalent circuit and spreadsheet programs.

Interpretation of Impedance Results

Figure 2:
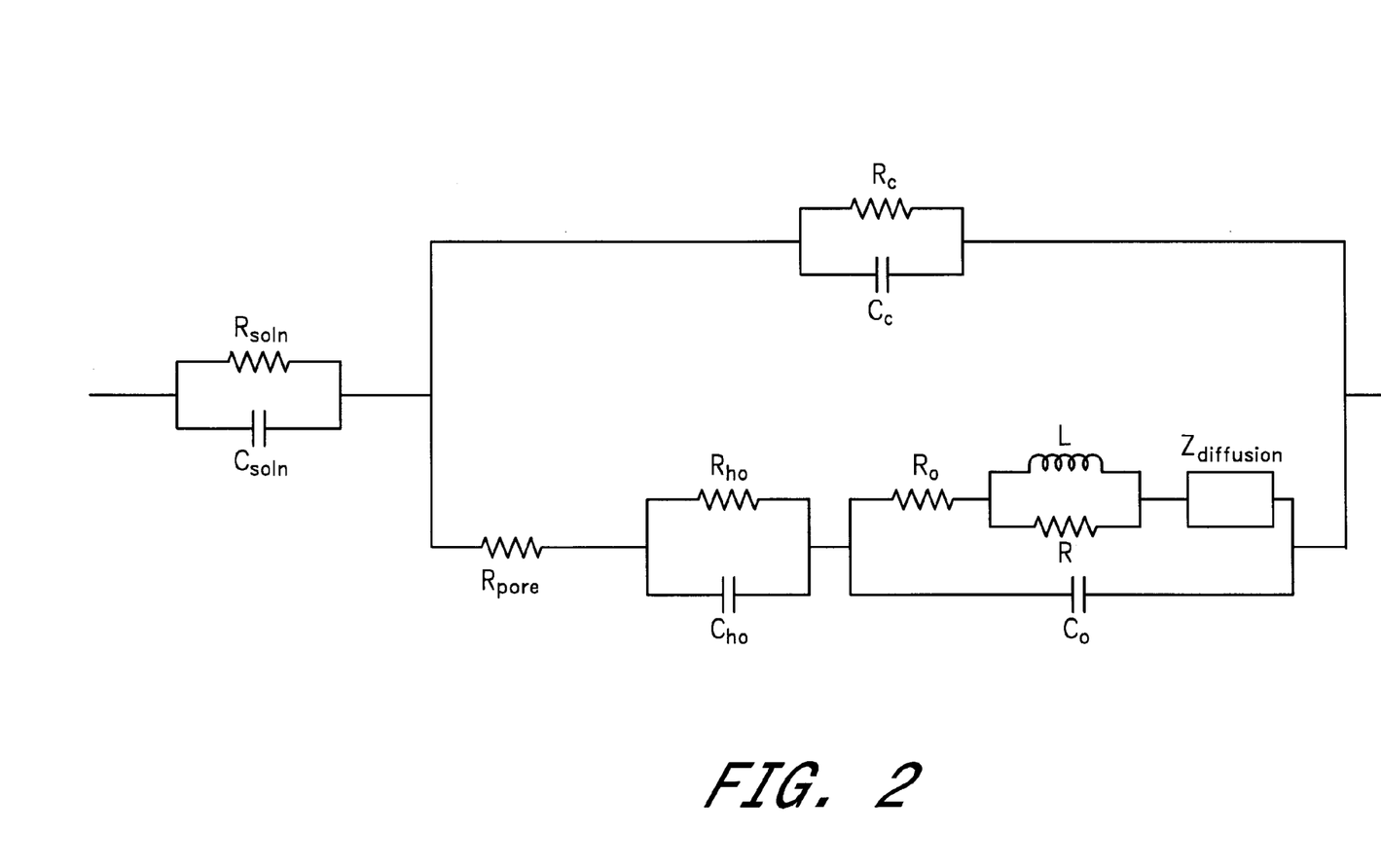
FIG. 2 is a schematic diagram of the equivalent circuit used assess the electrical properties of the present invention.
Figure 3:
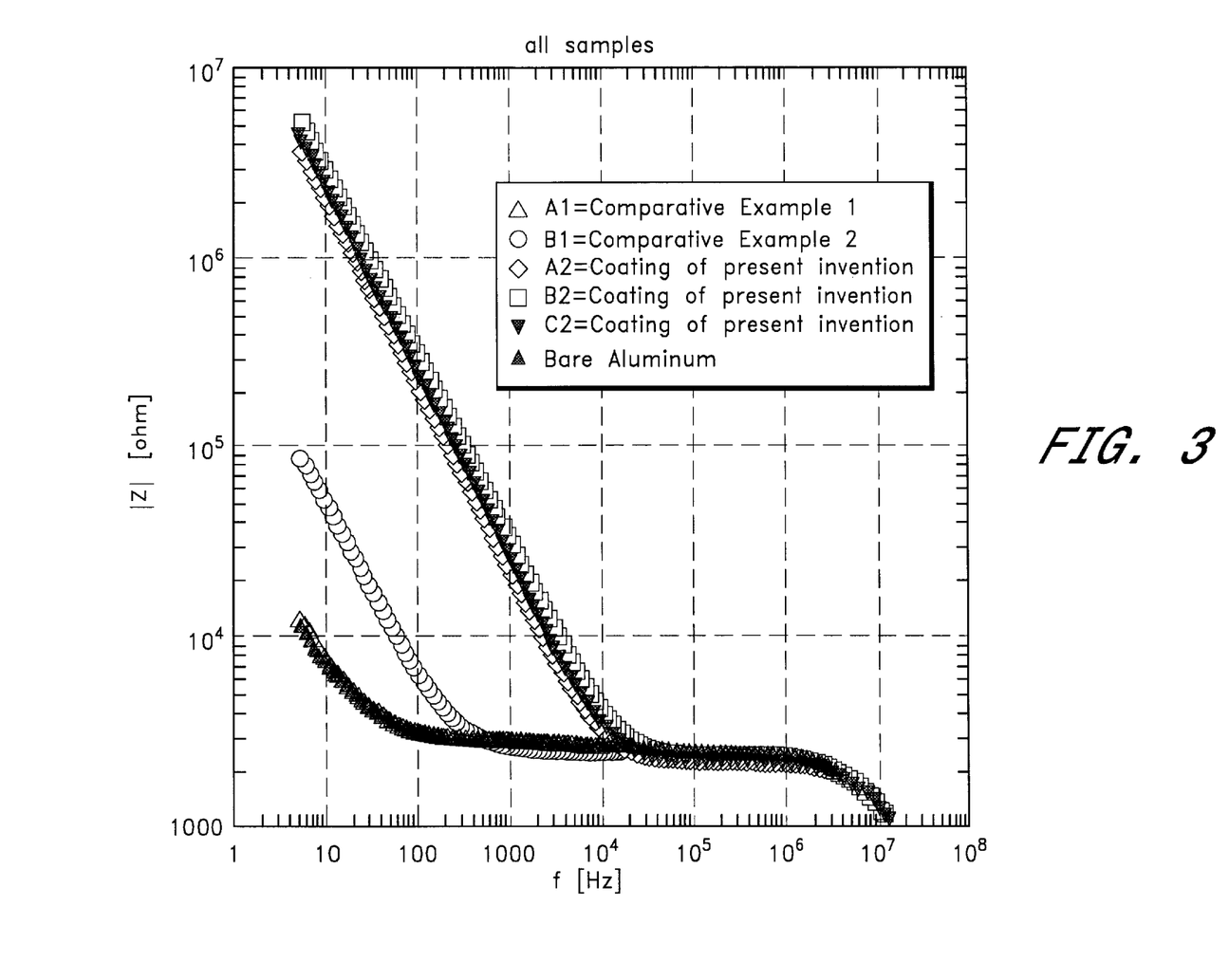
FIG. 3 is a Bode plot of impedance for articles coated with the protective coating of the present invention and articles coated with prior art processes.
Figure 4:
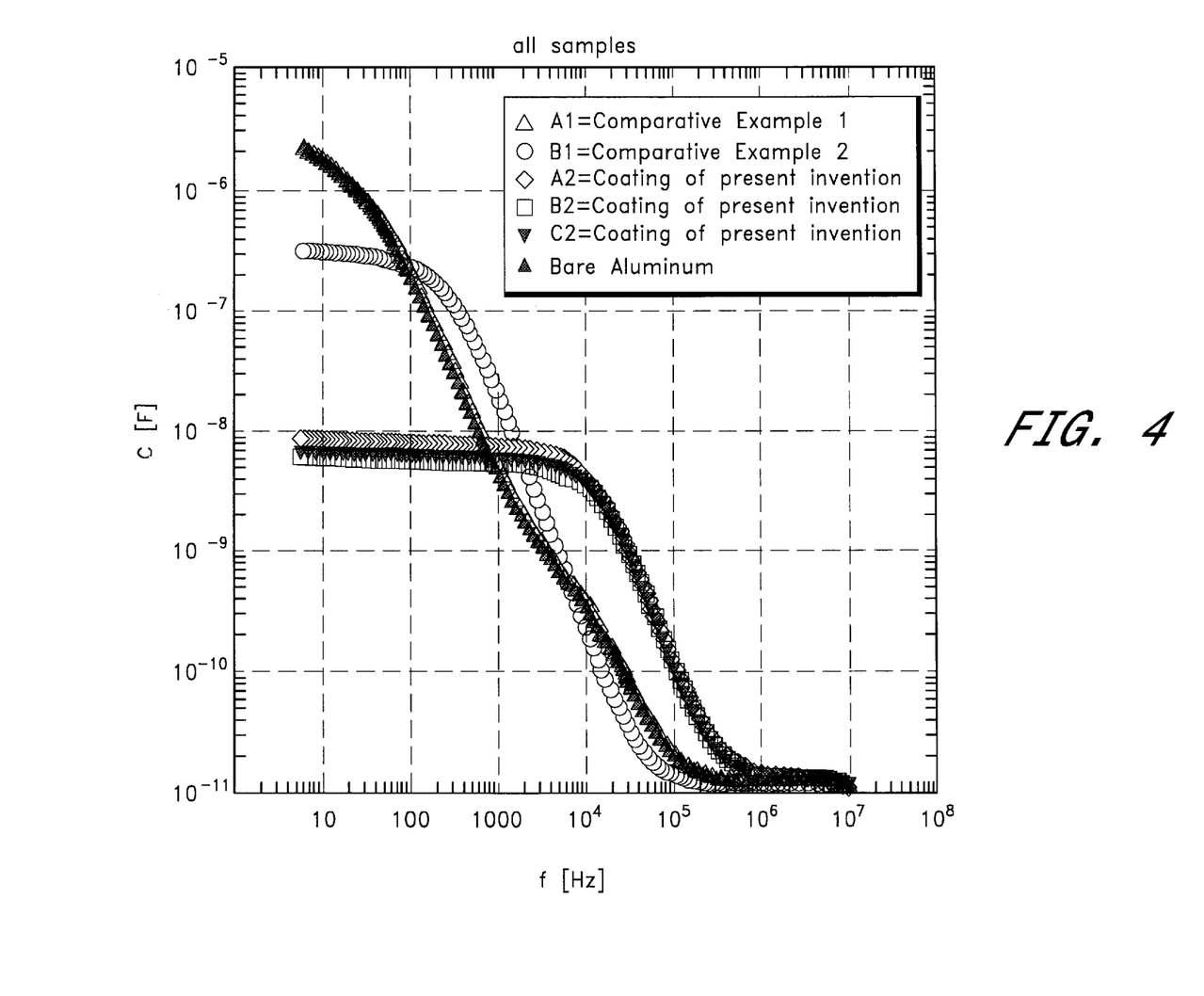
FIG. 4 is a Bode plot of capacitance for articles coated with the protective coating of the present invention and articles coated with prior art processes.

The equivalent circuit of Grandle and Taylor, as depicted in FIG. 2, was employed to interpret the data plotted in FIGS. 3–6. (See J. A. Grandle and S. R. Taylor, "Electrochemical Impedance Spectroscopy of Coated Aluminum Beverage Containers: Part 1—Determination of an Optimal Parameter for Large Sample Evaluation," Corrosion, 50(1) 792–803 (1994).; J. A. Grandle and S. R. Taylor, "Electrochemical Impedance Spectroscopy of Coated Aluminum Beverage Containers—Part 2: Statistical Analysis of Performance, Corrosion, 53 (5) 347–355 (1997), each incorporated by reference herein). This model was developed for coated aluminum beverage containers, and incorporates components of the barrier oxide model of Bessone et al. (See J. Bessone, C. Mayer, K. Juttner and W. J. Lorenz, "AC-Impedance Measurements on Aluminum Barrier Type Oxide Films," Electrochim. Acta, 28 (2) 171–175 (1983), incorporated by reference herein) for uncoated aluminum in aqueous solutions. In this equivalent circuit, $R_{soln}$ and $C_{soln}$ stand for the solution resistance and capacitance, respectively. These resistances appear as the high frequency plateau in the Bode plot of impedance in FIG. 3 between $10^4$ and $10^6$ Hz The rest of the equivalent circuit in FIG. 1 consists of two parallel legs. The top leg consists of the coating resistance ($R_c$) in parallel with its capacitance ($C_c$). The bottom leg is essentially that of uncoated, but passivated, aluminum as addressed by pores (pin holes, holidays, defects, etc.) in/through the coating. In the absence of a coating, the bottom leg is the only current path and $R_{pore}$ is zero. In addition to the passive oxide coating ($R_0$, $C_0$) which may or may not have inductive and diffusive elements (L, R, $Z_{diffusion}$), there is a separate feature for a hydrated oxide layer between the passive oxide and the solution ($R_{ho}$, $C_{ho}$). For bare aluminum a small intermediate frequency feature may be seen, which may be associated with ($R_{ho}$, $C_{ho}$) and the start of a much more resistive arc corresponding to the complex parallel circuit ($R_0C_0$, L, R, $Z_{diffusion}$), but most likely dominated by $R_0C_0$. The experimental frequency range used was too high to calculate extremely precise values for either $R_0$ or $C_0$. The Bode plot of capacitance for the bare aluminum sample in FIG. 4 is indicative of a low frequency plateau just below the experimental frequency range of 5 Hz which was used, on the order of 50 µF. Given the contact area employed, this would correspond to a passive oxide thickness of ~10 nm, using the standard equation:

$$C = \epsilon_r \epsilon_0 (A/1) \quad (1)$$

where C is capacitance, $\epsilon_r$ is the relative dielectric constant (~10 for alumina), $\epsilon_0$ is the permittivity of free space, A is area and 1 is film thickness. This value is quite reasonable for a passive oxide film. In contrast to FIG. 4, there is no evidence of a low frequency plateau in the impedance Bode plot for the bare aluminum sample in FIG. 3 This undoubtedly exists, however, at frequencies well below the experimental range employed.

The results for the coated samples may be interpreted in comparison to the bare aluminum. When the coatings are continuous (i.e., pores/defects are negligible or nonexistent), $R_{pore}$ is essentially infinite and the bottom leg is not a factor in the response. The simplified equivalent circuit is essentially the solution circuit ($R_{soln}$ $C_{soln}$) in series with the coating circuit ($R_c C_c$).

Referring to FIG. 3, there is shown the Bode plot of the impedance (Z) of each of the measured samples as a function of frequency. Frequency measurements were made from 5 Hz to $10^7$ Hz. From FIG. 3 it is apparent that at frequencies of 5 Hz or greater, the value for impedance for the coatings ($R_c$) of the present invention cannot be precisely determined. This value would show up as a plateau in impedance at frequencies well below the experimental range (<5 Hz). All that can be said is that these coatings have resistances in excess of $10^6$ Ohm at 5 Hz. Using coating thicknesses (~1 µm) calculated from their capacitances (see below) and the standard equation:

$$R = \rho(1/A) \quad (2)$$

this requires coating resistivities in excess of $10^{11}$ (ohm-cm). Also referring to FIG. 3, it can be seen that the coatings of the present invention (Samples 1–3, prepared in accordance with the teachings of Example 1) exhibit much higher impedance in frequency ranges from 5 Hz to $10^4$ Hz, on the order of several magnitudes greater than bare aluminum and the comparative examples. These results are summarized below in Table 3. Table 3 also summarizes the results observed when a brass substrate is coated.

TABLE 3

| Coating | Impedance at 1000 Hz in ohms | Impedance at 100 Hz in ohms | Impedance at 10 Hz in ohms |
| --- | --- | --- | --- |
| Bare Aluminum | 4,000< | 4,000< | 10,000< |
| Comparative Ex. 1 | 4,000< | 4,000< | 10,000< |
| Comparative Ex. 2 | 4,000< | 8,000< | 60,000< |
| Present Invention Example 1 | ~20,000 | ~200,000 | ~2,000,000 |
| Present Invention Example 8 | ~30,000 | ~100,000 | ~3,000,000 |
| Present Invention Example 5 | ~20,000 | ~200,000 | ~2,000,000 |
| Bare Brass | 3500< | 500< | 5000< |
| Comparative Ex. 1 (Substituting brass substrate) | 3500< | 3500< | 5000< |
| Present Invention (Substituting brass substrate) | ~20,000 | ~200,000 | ~500,000 |

Referring to FIG. 4, there is shown a plot of capacitance of the tested samples as a function of frequency. As known to those of skill in the art, capacitance is the ratio of the charge on either conductor of a capacitor to the potential difference between the conductors. Capacitance is measured in farads (F). Because of their insulative properties, good coatings behave like capacitors, by keeping the charge on either side of the coated sample apart. Conversely, poorer coatings do not function well as capacitors, because the separated charges can flow through the metal via defects in the coating surface. A smaller value for capacitance at a particular frequency is indicative of a thicker coating. Furthermore, the presence of a plateau (relatively horizontal part of curve in FIG. 4) implies a defect-free coating with little or no microscopic defects that could create current leaks. For purposes of the present invention, a plateau is reached when capacitance does not increase by more than about 25% in response to a one order of magnitude decrease in frequency. As shown in FIG. 4, and summarized in Table 4 below, the coatings of the present invention are better in capacitance in the frequency range of 5 to 5000 Hz. The coatings of the present invention first reach a plateau in capacitance at about 5000 Hz. Table 4 also summarizes the results observed when a brass substrate is coated.

TABLE 4

| Coating | Capacitance at 500 Hz in Farads | Capacitance at 100 Hz in Farads | Capacitance at 5 Hz in Farads |
| --- | --- | --- | --- |
| Bare Aluminum | ~$10^{-8}$ | ~$10^{-7}$ | ~$1 \times 10^{-6}$ |
| Comparative Ex. 1 | ~$10^{-8}$ | ~$10^{-7}$ | ~$1 \times 10^{-6}$ |
| Comparative Ex. 2 | ~$5 \times 10^{-8}$ | ~$3 \times 10^{-7}$ | ~$3 \times 10^{-7}$ |
| Present Invention Example 1 | ~$8 \times 10^{-9}$ | ~$8 \times 10^{-9}$ | ~$8 \times 10^{-9}$ |
| Present Invention Example 8 | ~$6 \times 10^{-9}$ | ~$6 \times 10^{-9}$ | ~$6 \times 10^{-9}$ |
| Present Invention Example 5 | ~$7 \times 10^{-9}$ | ~$7 \times 10^{-9}$ | ~$8 \times 10^{-9}$ |
| Bare Brass | ~$5 \times 10^{-8}$ | ~$1 \times 10^{-7}$ | ~$5 \times 10^{-6}$ |
| Comparative Ex. 1 (Substituting brass substrate) | ~$5 \times 10^{-8}$ | ~$1 \times 10^{-7}$ | ~$5 \times 10^{-6}$ |
| Present Invention (Substituting brass substrate) | ~$8 \times 10^{-9}$ | ~$8 \times 10^{-9}$ | ~$2 \times 10^{-8}$ |

Bode plots of capacitance are useful to calculate the thickness of the films of the coatings of the present invention. Below $10^4$ Hz these films exhibit a clear plateau in capacitance on the order of 8 nF. This is the coating capacitance ($C_c$) in the equivalent circuit model of FIG. 2. Plugging this value into Eq. 1 and employing a relative dielectric constant of ~10 (typical of oxides), we obtain a thickness of ~1 micrometer for these coatings.

Corrosion Testing

The coatings of the present invention also exhibit greatly superior performance in comparison to prior art coatings in standardized corrosion tests. Shown below in Table 3 are the results of ASTM Standard Method for Copper-Accelerated Acetic Acid-Salt Spray (FOG) Testing (CASS), Test # b 368–85, the entirety of which is incorporated herein by reference. Comparative Examples 1 and 2 were prepared as described above. Panel 1 of the present invention was prepared in accordance with the teachings of Example 1, above. As seen below, the coating of the present invention is capable of withstanding the CASS test for at least 96 hours with little or no corrosion. It should also be pointed out that when defects did occur in the present invention, as in Panel 1, the defects were small, 0.1–0–0.65 mm in diameter, when compared to the to the defects of Comparative Examples 1 and 2, with defects as large as 2 mm.

TABLE 5a (CASS Test ASTM #B368-85)

| Time in CASS test | Comparative Example 2 | Comparative Example 1 | Present Coating Example 1 |
|---|---|---|---|
| 6 hrs | White spots forming | No corrosion | No corrosion |
| 22 hrs | >40 c.p (sizes 0.1–1.1 mm) | >40 c.p (sizes 0.1–0.5 mm) | No corrosion |
| 48 hrs | ~220 c.p (sizes 0.35–2 mm); greyish-brown discolorations around corrosion | ~300 c.p (sizes 0.1–1.1 mm) | No corrosion |
| 96 hrs | Test discontinued[+] | Test discontinued[+] | Start of c.p (size < 0.1 mm), Very light, barely visible |
| 192 hrs | Test discontinued[+] | Test discontinued[+] | ~200 c.p (sizes 0.1–0.35 mm) |
| 240 hrs | Test discontinued[+] | Test discontinued[+] | ~200 c.p (sizes 0.1–0.6 mm - most are 0.35 mm) |

*Above substrates consisted of thin aluminum panels with smooth polished surfaces Shown in Tables 5b–5e is additional CASS Test data for samples prepared in accordance with Examples 8–10. As the data clearly shows, the coatings of the present invention provide for superior corrosion protection in comparison to prior art coatings.

TABLE 5b (CASS Test ASTM #B368-85)

| Time in CASS test | Present Coating Example 1 | Present Coating Example 8 | Present Coating Example 9 |
|---|---|---|---|
| 6 hrs | No corrosion | No corrosion | No corrosion |
| 22 hrs | No corrosion | No corrosion | No corrosion |
| 48 hrs | No corrosion | No corrosion | No corrosion |
| 96 hrs | 55 c.p. (0.1–0.2 mm) | 28 c.p. (0.1–0.9 mm) | 66 c.p. (0.1–0.8 mm) |
| 192 hrs | 171 c.p. (0.1–0.5 mm) | 111 c.p. (0.1–0.9 mm) | 130 c.p. (0.2–0.9 mm) |
| 240 hrs | 260 c.p. (0.1–0.9 mm) | 125 c.p. (0.2–1.4 mm) | 155 c.p. (0.2–0.9 mm) |

*Above substrates consisted of thick aluminum panels with rougher polished surface. Number and size of corrosion points based on an average between two samples.

TABLE 5c (CASS Test ASTM #B368-85)

| Time in CASS test | Comparative Example 1 (w/brass) | Present Coating Example 10, Table 2 (CV) | Present Coating Example 10, Table 2 (CC) |
|---|---|---|---|
| 20 hrs | colored spots on coating (not c.p.) | no c.p. | no c.p. |
| 40 hrs | spots continue to grow; coating loss | no c.p. | no c.p. |
| 60 hrs | most of panel uncoated; red/orange discoloration | no c.p.; little coating loss; little discoloration - still good | no c.p.; little coating loss; little discoloration - still good |

*Above substrates consisted of thin brass panels with unpolished surfaces.

TABLE 5d (CASS Test ASTM #B368-85)

| Time in CASS test | Comparative Example 1 (Al wheel) | Present Coating Example 10, Table 2 (CV) |
|---|---|---|
| 20 hrs | 17 c.p. (0.2–0.7 mm) | no c.p. |
| 40 hrs | 160 c.p. (0.1–1.0 mm) | no c.p. |
| 60 hrs | 180 c.p. (0.2–1.2 mm) | 40 c.p. (0.1–0.4 mm) |
| 100 hrs | 260 c.p. (0.1–0.5 mm) | 55 c.p. (0.2–0.5 mm) |
| 150 hrs | Test discontinued[+] | 90 c.p. (0.2–1.6 mm) |
| 260 hrs | Test discontinued[+] | 100 c.p. (0.2–2.0 mm) |

*corrosion points (c.p.) counted in a 2×1 in² rectangle on a surface ~15° from vertical in the CASS test.

TABLE 5e (CASS Test ASTM #B368-85)

| Time in CASS test | Present Coating Example 12, Table 1, Sample 3, CV | Present Coating Example 12, Table 1, Sample 3, CC | Present Coating Example 12, Table 1, Sample 4, CV | Present Coating Example 12, Table 1, Sample 4, CC |
|---|---|---|---|---|
| 20 hrs | no c.p. | no c.p. | no c.p. | no c.p. |
| 40 hrs | no c.p. | no c.p. | no c.p. | no c.p. |
| 60 hrs | no c.p. | no c.p. | no c.p. | no c.p. |
| 100 hrs | 27 c.p. (0.1–0.3 mm) | 33 c.p. (0.2–0.3 mm) | 22 c.p. (0.1–0.2 mm) | 17 c.p. (0.1–0.2 mm) |
| 150 hrs | 60 c.p. (0.1–0.3 mm) | 44 c.p. (0.1–0.4 mm) | 40 c.p. (0.2–0.3 mm) | 18 c.p. (0.2–0.4 mm) |
| 260 hrs | 72 c.p. (0.1–0.8 mm) | 47 c.p. (0.2–0.5 mm) | 77 c.p. (0.2–0.8 mm) | 44 c.p. (0.2–0.8 mm) |

*corrosion points (c.p.) counted in a 2×1 in² rectangle on a surface ~15° from vertical in the CASS test.

Referring to Table 6, below, are shown the results of thermal shock tests. Prior to subjection to the CASS Test #B 368–85, samples are prepared by immersing the panel to be tested in 38±2° C. water bath for 3 hours. The panel is then placed in a freezer set at −29±2° C. for three hours. After three hours in the freezer, the panel is taken out and an "X" is inscribed in the center of the panel using an carbide tip scribe through the coating and into the substrate. Within 60 seconds, the inscribed X is exposed to steam perpendicular to the panel surface and one inch away from the steam source (steam kettle) for 60 seconds.

TABLE 6

(CASS Test ASTM #B368-85)
(Thermal Shock)

| Time in CASS test | Comparative Example 2 | Comparative Example 1 | Present Coating (Example 1) |
|---|---|---|---|
| 6 hrs | >40 c.p (sizes 0.35 mm) | No corrosion | No corrosion |
| 22 hrs | ~300 c.p (size 0.1–1.2 mm) | >40 c.p (sizes 0.1–0.5 mm) | No corrosion |

TABLE 6-continued (CASS Test ASTM #B368-85)
(Thermal Shock)

| Time in CASS test | Comparative Example 2 | Comparative Example 1 | Present Coating (Example 1) |
|---|---|---|---|
| 48 hrs | ~300 c.p (size ~0.35–1.9 mm); major discolorations around whole panel | ~320 c.p (sizes 0.1–1.3 mm) | No corrosion |
| 96 hrs | Test discontinued+ | Test discontinued+ | ~25 c.p (size 0.1 mm), very light |
| 192 hrs | Test discontinued+ | Test discontinued+ | ~120 c.p (size 0.1–0.35 mm - most 0.35 mm) |
| 240 hrs | Test discontinued+ | Test discontinued+ | ~120 c.p (sizes 0.1–0.65 mm - most are ~0.5 mm) |

\* Corrosion points (c.p) appeared as white dots
\*\* Although panel 2 showed no corrosion points in the designated rectangle, corrosion points did appear on places of uneven coating (i.e. drips) and also on places were coating was thinner (top of panel). Panels that were thermal shocked under these coating conditions also showed corrosion points on the scribed "X".
+ Failure Judgments:

1.) Comparative Example 2 panels were pulled at 48 hrs due to the presence of many large corrosion points and much discoloration surrounding areas of corrosion.

2.) Comparative Example 1 panels were pulled at 48 hrs due to the many corrosion points present and the size of the corrosion points.

Ionic Conductivity

Another measure of coating perfection is the ability of the coating to restrict electrical conduction by ions in a solution. When a solution is electrified, ions in the solution are known to conduct electrical changes. If a coated metal surface is used as the anode in an electrified solution, the presence of defects on the surface of the coating would provide channels to the conductive metal underneath through which ions could transfer their changes through to the metal. Such conductance is measured in amperes. Higher conductances in amperes are indicative of a coating with greater defects.

To compare conductance, samples were coated using the present method, and the methods of Comparative Examples 1 and 2. The samples were then placed in a 45% v/v solution of sodium silicate, and an electrode was attached to the samples. The samples served as the anode. An electrical potential of 60 volts was applied, and the initial amperes of current flow were measured. Measurements were made at successive time intervals, as shown below in Table 7:

TABLE 7

| Time in Solution (seconds) | (Amps) Comparative Example 2 | (Amps) Comparative Example 2 | (Amps) Sample 1 | (Amps) Sample 1 |
|---|---|---|---|---|
| 0 | 5.0 | 5.2 | 0.02 | 0.06 |
| 1 | Fast change in current | Fast change in current | 0.01 | 0.04 |
| 2 | | | | |
| 3 | ↓ | ↓ | 0.01 | 0.03 |
| 5 | ↓ | ↓ | 0.01 | 0.02 |
| 10 | ↓ | ↓ | 0.01 | 0.01 |
| 30 | 0.58 | 1.5 | 0.01 | 0.01 |
| 60 | 0.36 | 0.11 | 0.01 | 0.01 |
| 300 | 0.18 | 0.04 | 0.01 | 0.01 |

\*\* Thick panels used were used for this analysis (0.25 inches thick)

Although the present invention and its advantages have been described in detail by referring to specific embodiments, it should be understood that various changes, substitutions and alterations can be made to such embodiments, as is known to those of skill in the art, without departing from the spirit and scope of the invention which is defined by the following claims.

What is claimed is:

1. An alkali silicate containing coating on a conductive metal surface, the coating having an impedance of at least about 100,000 ohms at a frequency of about 10 Hz, the coating being formed in part by first immersing an electrically conductive surface in an alkali silicate solution while simultaneously
   i) applying an electrical potential to the surface and
   ii) imparting mechanical energy in a form selected from sound waves and ultrasonic waves to the surface and the solution and then subjecting the coating to a heat treatment.

2. The alkali silicate coating of claim 1, having an impedance of greater than about 300,000 ohms at a frequency of about 100 Hz.

3. The alkali silicate coating of claim 1, having an impedance of greater than about 500,000 ohms at a frequency of 10 Hz.

4. The alkali silicate coating of claim 1, having an impedance of greater than about 1 million ohms at a frequency of 10 Hz.

5. The alkali silicate coating of claim 1, wherein the alkali silicate solution comprises sodium silicate.

6. The alkali silicate coating of claim 1, wherein the alkali silicate solution comprises potassium silicate.

7. The alkali silicate coating of claim 1, wherein the metal comprises aluminum.

8. The alkali silicate coating of claim 1, wherein the metal comprises brass.

9. The alkali silicate coating of claim 1, wherein the metal comprises steel.

10. The alkali silicate coating of claim 1, wherein the capacitance of the coating is less than $1 \times 10^{-8}$ at a frequency of about 5 Hz.

11. The alkali silicate coating of claim 1, wherein the coating is capable of preventing pitting when the coated metal surface is subjected to CASS Test ASTM B368–85 for a time period of 48 hours.

12. The alkali silicate coating of claim 1 wherein the solution contains at least one hydrated alkali silicate $M_2O$ $mSiO_2$ $nH_2O$ wherein m and n are the number of moles of $SiO_2$ and $H_2O$, respectively, per mole of $M_2O$ and M is an alkali metal.

13. The alkali silicate coating of claim 12 wherein M is Na and m is in the range of about 2.0 to 3.6.

14. The alkali silicate coating of claim 12 wherein M is K and m is in the range of about 1.6 to 2.5.

15. The alkali silicate coating of claim 1 wherein the solution contains defoaming agents.

16. The alkali silicate coating of claim 1 wherein the solution contains wetting agents.

17. The alkali silicate coating of claim 1 wherein the specific gravity of the solution is in the range of about 1.02 to 1.3.

18. The alkali silicate coating of claim 1 wherein the solution is filtered using filter media with pores ranging in size from about 1 to 10 micrometers.

19. The alkali silicate coating of claim 1 wherein the electrical potential is applied such that the surface functions as an anode.

20. The alkali silicate coating of claim 19 wherein the electrical potential is in the range of about 2 to 100 volts.

21. The alkali silicate coating of claim 1 wherein the frequency of said sound waves is in the range of about 25 to 175 kHz.

22. The alkali silicate coating of claim 1 wherein prior to immersing in the solution, the surface is subjected to at least one additional treatment selected from the group consisting of i) cleaning, ii) drying, iii) polishing, and iv) exposure to a flame from a torch.

23. The alkali silicate coating of claim 1, wherein the surface consists primarily of a substance selected from the group consisting of aluminum and aluminum alloys, and the surface is exposed to a flame from a torch prior to immersing in the solution.

24. The alkali silicate coating of claim 23 wherein the flame is in the range of about 500 to 3000° C.

25. The alkali silicate coating of claim 24, wherein the surface is exposed to the flame for a time period in the range of about 1 to 60 seconds.

26. A alkali silicate coating as in claim 23, wherein the surface is wet, and the surface is subsequently exposed to the flame for a time sufficient to remove all water present on said surface.

27. An aluminum surface coated with a silicate containing coating derived from an alkali silicate, the silicate coating having an impedance of at least 100,000 ohms at a frequency of about 100 Hz, the coating being formed in part by first immersing an electrically conductive surface in an alkali silicate solution while simultaneously
  i) applying an electrical potential to the surface and
  ii) imparting mechanical energy in a form selected from sound waves and ultrasonic waves to the surface and the solution
and then subjecting the coating to a heat treatment.

28. The aluminum surface of claim 27, the silicate coating having an impedance of at least 500,000 ohms at a frequency of about 10 Hz.

29. The aluminum surface of claim 27, wherein the capacitance of the silicate coating is less than $5\times10^{-8}$ at a frequency of about 5 Hz.

30. The aluminum surface of claim 27, wherein the coating is capable of preventing formation of pits in the aluminum surface having a diameter greater than 0.1 mm, when the surface is subjected to CASS Test ASTM B368-85 for a time period of 48 hours.

31. The aluminum surface of claim 27, wherein the coating is capable of preventing formation of pits in the aluminum surface having a diameter greater than 0.1 mm, when the surface is subjected to CASS Test ASTM B368-85 for a time period of 60 hours.

32. The aluminum surface of claim 27, wherein at least a portion of the coated surface having an area of 2 square inches is capable of withstanding the ASTM CASS test #B368-85 test for 48 hours without formation of corrosion points within the area greater in diameter than 0.1 mm.

33. The aluminum surface of claim 27, the coating having an average thickness ranging from about 0.7 to 2 micrometers.

* * * * *